US009038410B2

(12) United States Patent
Erbs et al.

(10) Patent No.: US 9,038,410 B2
(45) Date of Patent: May 26, 2015

(54) METHOD AND SYSTEM FOR THE CONTINUOUS OR SEMI-CONTINUOUS PRODUCTION OF FLAVORED ICE

(75) Inventors: Daryl G. Erbs, Sheboygan, WI (US); John P. Myers, Manitowoc, WI (US); Cary J. Pierskalla, Manitowoc, WI (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 521 days.

(21) Appl. No.: 13/167,508

(22) Filed: Jun. 23, 2011

(65) Prior Publication Data

US 2012/0000206 A1 Jan. 5, 2012

Related U.S. Application Data

(60) Provisional application No. 61/360,482, filed on Jun. 30, 2010.

(51) Int. Cl.

| | |
|---|---|
| ***A23G 9/22*** | (2006.01) |
| ***A23G 9/32*** | (2006.01) |
| ***A23G 9/42*** | (2006.01) |
| ***A23G 9/00*** | (2006.01) |

(52) U.S. Cl.

CPC ... *A23G 9/22* (2013.01); *A23G 9/32* (2013.01); *A23G 9/00* (2013.01); *A23G 9/42* (2013.01)

(58) Field of Classification Search

CPC ........ F25D 2700/04; A23G 9/42; A23G 9/43; A23G 9/33; A23G 9/00

USPC .................. 62/233, 337, 344, 377; 222/146.6

See application file for complete search history.

(56) References Cited

U.S. PATENT DOCUMENTS

| | | | | |
|---|---|---|---|---|
| 2,608,837 | A * | 9/1952 | Leland | 62/393 |
| 3,104,406 | A | 9/1963 | Rhodes | |
| 5,141,011 | A | 8/1992 | Bjerklund et al. | |
| 5,325,679 | A * | 7/1994 | Tatematsu et al. | 62/188 |
| 5,394,705 | A | 3/1995 | Torii et al. | |
| 5,934,705 | A * | 8/1999 | Siddiqui et al. | 280/736 |
| 6,672,097 | B1 * | 1/2004 | Ashley | 62/340 |
| 7,188,479 | B2 | 3/2007 | Anselmino et al. | |
| 8,171,744 | B2 * | 5/2012 | Watson et al. | 62/66 |
| 2006/0277937 | A1 * | 12/2006 | Schlosser et al. | 62/344 |

(Continued)

FOREIGN PATENT DOCUMENTS

| | | |
|---|---|---|
| CN | 1877231 A | 12/2006 |
| CN | 200996762 Y | 12/2007 |

(Continued)

OTHER PUBLICATIONS

International Search Report and Written Opinion dated Nov. 1, 2011 for corresponding International Patent Application No. PCT/US2011/041673.

(Continued)

*Primary Examiner* — Ljiljana Ciric
*Assistant Examiner* — Alexis Cox
(74) *Attorney, Agent, or Firm* — Ohlandt, Greeley, Ruggiero & Perle, LLP

(57) ABSTRACT

An ice making system includes a flavored liquid, an ice machine and a refrigerated storage bin. The ice making system continuously produces flavored ice pieces for storage in an ice storage bin. A refrigeration system cools the ice storage bin.

18 Claims, 13 Drawing Sheets

(56) References Cited

U.S. PATENT DOCUMENTS

| | | | | |
|---|---|---|---|---|
| 2008/0066483 | A1 | 3/2008 | Klier et al. | |
| 2011/0023505 | A1* | 2/2011 | Popov et al. | 62/89 |
| 2011/0120153 | A1* | 5/2011 | Rugeris | 62/74 |
| 2012/0000206 | A1* | 1/2012 | Erbs et al. | 62/1 |
| 2012/0192584 | A1* | 8/2012 | Fiaschi | 62/340 |

FOREIGN PATENT DOCUMENTS

| | | | |
|---|---|---|---|
| EP | 1842430 | A1 * | 10/2007 |
| JP | 547772 | | 6/1993 |
| JP | 0547772 | | 6/1993 |
| JP | 08178486 | | 7/1996 |
| JP | 08178486 | | 12/1996 |
| JP | 09229525 | | 9/1997 |
| JP | 10281601 | | 10/1998 |
| JP | 11294911 | | 10/1999 |
| JP | 2004173539 | | 6/2004 |
| JP | 2009074789 | | 4/2009 |
| JP | 2010139197 | | 6/2010 |
| JP | 20100139197 | | 6/2010 |

OTHER PUBLICATIONS

International Preliminary Report on Patentability dated Sep. 28, 2012 corresponding to PCT Application No. PCT/US11/41673.

English translation of First Office Action dated Aug. 1, 2013 for corresponding Chinese patent application No. 201180032416.6, pp. 11.

Japanese Office Action dated Dec. 16, 2013 for Japanese application No. JP2013-518497.

Chinese Office Action dated Mar. 13, 2014 for Chinese application No. 201180032416.6.

Chinese Office Action dated Jun. 5, 2014 for Chinese application No. 201180032416.6.

Japanese Office Action (with English translation) dated Oct. 21, 2014 for Japanese application No. 2013-518497.

* cited by examiner

METHOD AND SYSTEM FOR THE CONTINUOUS OR SEMI-CONTINUOUS PRODUCTION OF FLAVORED ICE

CROSS-REFERENCED APPLICATIONS

This application claims priority to U.S. Provisional Application Ser. No. 61/360,482, filed on Jun. 30, 2010, which is incorporated herein in its entirety by reference thereto.

BACKGROUND OF THE DISCLOSURE

1. Field of the Disclosure

The present disclosure relates to an ice making system for the continuous or semi-continuous production of flavored ice used in producing a flavored ice beverage (e.g., iced coffee). More specifically, the present disclosure relates to the formation of nugget ice by the extrusion of flaked ice with a flavored liquid, such as a coffee concentrate, which provides for reduced dilution of the beverage.

2. Description of Related Art

Consumers today often prefer chilled beverages that are traditionally served hot, as a cold or iced beverage, such as coffee and tea. In particular, iced coffee has become an extremely popular beverage. Typically, there are two ways to prepare an iced coffee beverage. First, is to brew a pot of hot coffee and then add regular ice cubes to chill. However, as the ice cubes melt over time the coffee becomes watered down or diluted, thus affecting the taste and quality of the beverage. A second way is to brew a pot of hot coffee and then place it in a refrigerator to chill. Unfortunately, this can take a while to chill and the coffee may become stale after an extended period of time. Thus, this can also have a negative effect on the taste and quality of the beverage.

Different methods have been developed in an attempt to overcome these disadvantages. One method is to double brew the coffee. Double-brewing involves doubling the amount of coffee grounds used to brew, thus providing a stronger flavored coffee. Therefore, as the ice melts and waters down or dilutes the coffee, a regular or average flavor of coffee is eventually achieved. This concept attempts to maintain the flavor as the ice melts and waters down the coffee. However, because the amount of ice used can vary, this often results in inconsistent flavor amongst the same product sold to customers. Since most producers of iced coffee seek to have a consistent flavor from drink to drink and from store to store, such inconsistent flavor is commercially unacceptable.

Another method used is to make coffee flavored ice or coffee ice cubes. This can be done using the same method and apparatus to make clear or batch style ice. In use, commercial and industrial ice making machines require a continuous circulation of an excess amount of water on the ice-making surface to provide the formation of clear ice. Thereafter, it is necessary to flush or dump a portion of the surplus water that contains the remaining concentrated minerals and chemicals to avoid freezing it into the ice. This process of making coffee ice cube requires a large amount of water, thus, increasing cost of production. Furthermore, it creates a considerable amount of foam and trapped air, resulting in ice having an undesirable hardness and consistency. Finally, it also results in a large quantity of coffee extract from being removed from the eventual ice cubes, thus creating a diluted and inconsistent iced coffee beverage.

Thus, there is a need for a method and an ice making system that continuously produces coffee ice without substantially diluting the resulting flavored beverage and/or without production of excess waste water or foam.

SUMMARY

The present disclosure provides for an ice making system including a flavored liquid or concentrate, an ice making machine and a storage bin for the continuous production of flavored ice pieces.

In one embodiment, the ice making system utilizes water and flavoring, such as coffee concentrate or coffee extract, which are mixed to produce the flavored liquid. In another embodiment, brewed coffee is directly used as the flavored liquid.

It is preferred that the ice making machine produces flavored ice nuggets. The ice making system may further include a reservoir to maintain the level of flavored liquid entering the nugget ice machine.

The storage bin of the present disclosure may be refrigerated for maintaining the flavored nugget ice quality and to prevent leaching of flavor from the flavored ice nugget.

In one embodiment of the system according to the present disclosure, an ice making system for making flavored ice pieces comprises a reservoir that holds a flavored liquid, an ice machine and a storage bin that stores the flavored ice pieces. The ice machine comprises an ice making evaporator and an augur centrally disposed within the evaporator. The ice machine receives the flavored liquid from the reservoir and produces the flavored ice pieces, which are then stored in the storage bin.

In another embodiment of the system according to the present disclosure, the ice pieces are selected from the group consisting of: flakes and nuggets.

In another embodiment of the system according to the present disclosure, the flavoring is selected from the group consisting of: a concentrate, extract, syrup, juice and other flavored product.

In another embodiment of the system according to the present disclosure, the flavoring is coffee, a coffee concentrate or a coffee extract.

In another embodiment of the system according to the present disclosure, a vessel stores a flavoring and a mixing device mixes the flavoring with water to produce the flavored liquid.

In another embodiment of the system according to the present disclosure, the mixing device comprises a mixing valve.

In another embodiment of the system according to the present disclosure, a pump controls a flow of the flavored liquid to the reservoir.

In another embodiment of the system according to the present disclosure, at least one refrigeration system refrigerates one or more selected from the group consisting of: the reservoir, the ice machine, the storage bin, the vessel, the mixing device, and the pump.

In another embodiment of the system according to the present disclosure, a control system controls the ice making machine to produce the flavored ice pieces.

In another embodiment of the system according to the present disclosure, a float mechanism is disposed to maintain a predetermined level of the flavored liquid in the reservoir. The control system deactivates the ice making machine if the flavored liquid drops below the predetermined level.

In another embodiment of the system according to the present disclosure, a temperature device is disposed in the storage bin. The control system regulates a temperature in the storage bin based on an output of the temperature measuring device.

In another embodiment of the system according to the present disclosure, the flavored ice pieces are removed from the storage bin either manually or automatically via a dispenser.

In one embodiment of the method according to the present disclosure, the method comprises holding a flavored liquid in a reservoir; delivering the flavored liquid from the reservoir to an ice making machine; producing the flavored ice pieces with the ice making machine; and storing the flavored ice pieces in a storage bin.

In another embodiment of the method according to the present disclosure, the ice pieces are selected from the group consisting of: flakes and nuggets.

In another embodiment of the method according to the present disclosure, the flavoring is selected from the group consisting of: a concentrate, extract, syrup, juice and other flavored product.

In another embodiment of the method according to the present disclosure, the flavoring is coffee, a coffee concentrate or a coffee extract.

In another embodiment of the method according to the present disclosure, the method further comprises storing a flavoring in a vessel and mixing the flavoring with water with a mixing device to produce the flavored liquid.

In another embodiment of the method according to the present disclosure, the method further comprises controlling with a pump a flow of the flavored liquid to the reservoir.

In another embodiment of the method according to the present disclosure, the method further comprises refrigerating one or more selected from the group consisting of: the reservoir, the ice machine, the storage bin, the vessel, the mixing device, and the pump.

In another embodiment of the method according to the present disclosure, the method further comprises maintaining a predetermined level of the flavored liquid in the reservoir and deactivating the ice making machine if the flavored liquid drops below the predetermined level.

In another embodiment of the method according to the present disclosure, the method further comprises regulating a temperature in the storage bin.

In another embodiment of the method according to the present disclosure, the method comprises removing the flavored ice pieces from the storage bin either manually or automatically.

BRIEF DESCRIPTION OF THE DRAWINGS

Other and further benefits, advantages and features of the present invention will be understood by reference to the following specification in conjunction with the accompanying drawings, in which like reference characters denote like elements of structure and.

DETAILED DESCRIPTION OF THE PREFERRED EMBODIMENT

Figure 1:
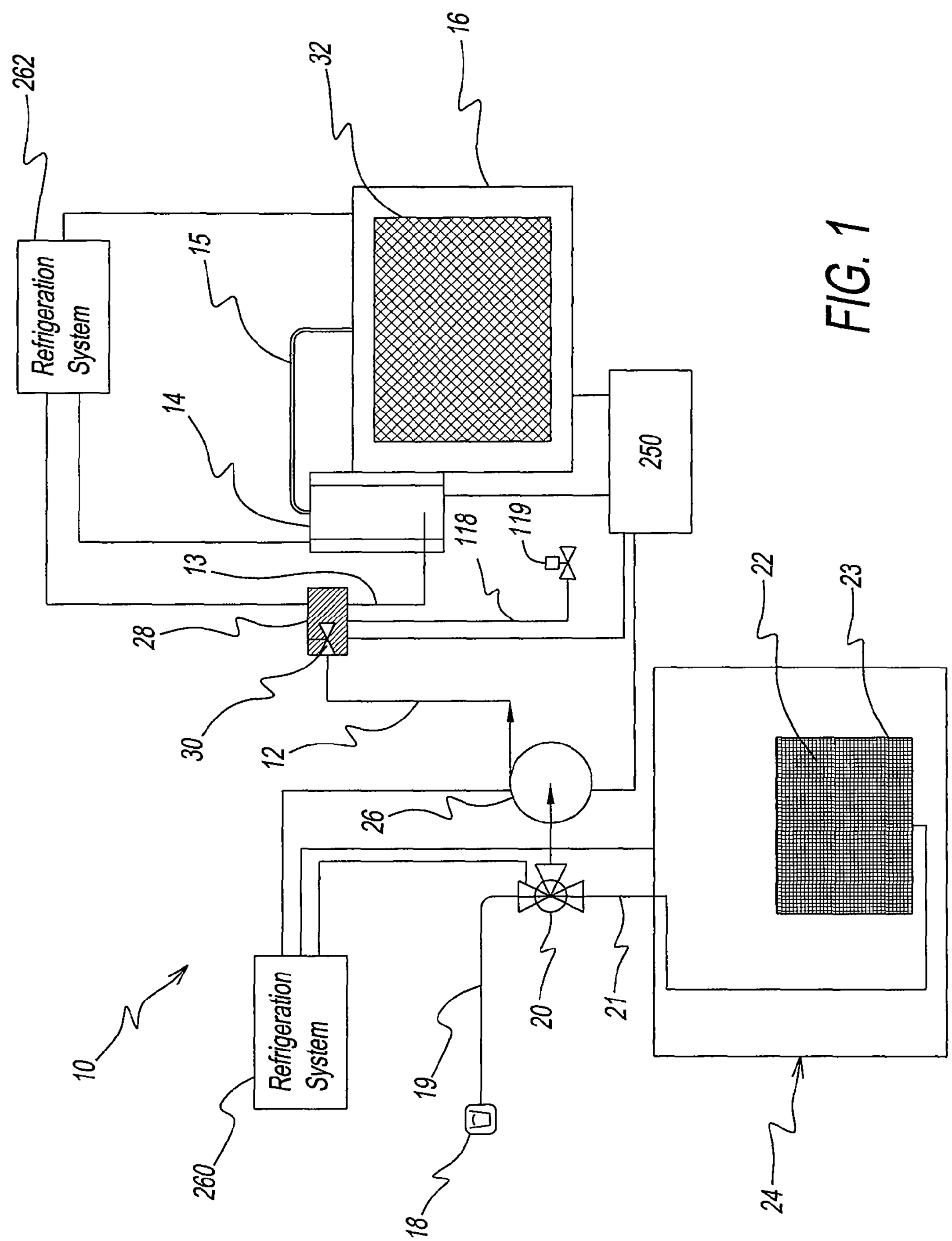
FIG. 1 is a schematic illustration of one embodiment of an ice making system for making flavored ice pieces according to the present disclosure.

Referring to FIG. 1, an ice making system 10 according to a first embodiment of the present disclosure comprises a flavored liquid, an ice machine 14 and a storage bin 16. Ice making system 10 employs a different ice making process than batch style ice making, thus making an improved quality flavored ice.

In one embodiment, as shown in FIG. 1, the operation of ice making system 10 begins with water being provided from any water supply 18, such as a water tap, water tank, distilled water, filtered water or other potable water supply. Water may be transported via tubes, pipes or other similar conduits 19 to a mixing valve 20. Water entering ice making system 10 may pass through a water filtration type system.

In addition to water, mixing valve 20 receives a supply of a flavoring 22 via a conduit 21. Flavoring 22 may be stored in a vessel 23. Flavoring 22 can be any type of flavoring selected by the user, including, but not limited to, a flavored concentrate, extract, syrup, juice concentrate, or other flavored product. Preferably, flavoring 22 is a coffee concentrate or coffee extract.

Vessel 23 containing flavoring 22 may be housed in a compartment 24 that is insulated and refrigerated by a refrigeration system 260 to maintain flavoring 22 at a desired temperature, as shown in FIG. 1. Furthermore, vessel 23 is typically a bag or box container holding a known volume of flavoring 22.

Preferably, mixing of water and flavoring 22 occurs in mixing valve 20 to produce a flavored liquid. Thereafter, the flavored liquid is metered via a pump 26, e.g., a positive displacement pump, which controls the flow of flavored liquid to a reservoir 28 via a conduit 12. This process generates a homogeneous solution of flavored liquid. In one embodiment, refrigeration system 260 also refrigerates mixing valve 20 and pump 26.

Ice making system 10 also comprises a main control system 250 for the regulation of making flavored ice pieces. Main control system 250 is in communication with various elements, such as, pump 26, reservoir 28, ice machine 14 and storage bin 16.

Optionally, mixing valve 20 is capable of detecting when vessel 23 no longer contains any flavoring 22. Thus, ice making system 10 can provide the user with a warning or signal when flavoring 22 is empty and needs to be replaced. This warning or signal can be any type of signal, including, but not limited to, a visual or audio type signal.

Flavored liquid is transported from reservoir 28 via conduit 13 to ice machine 14, as shown in FIG. 1. Ice machine 14 can be any type of ice machine, including, but not limited to, a nugget ice maker, a flaker ice maker or other similar ice machine. Preferably, ice machine 14 is an ice maker 50 for making nuggets, as shown in FIG. 2.

Figure 2:
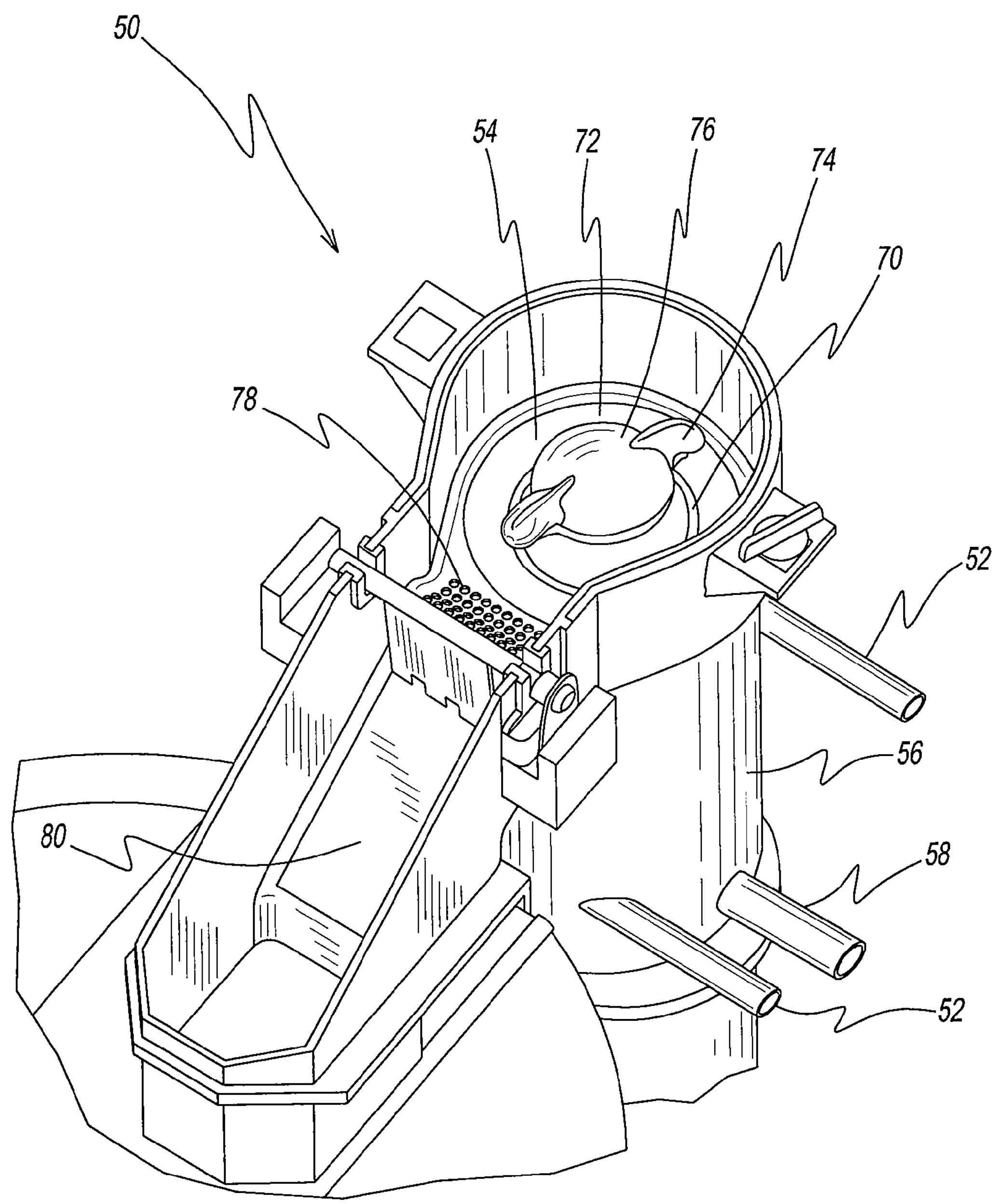
FIG. 2 is an isometric view of an ice making machine used according to the present disclosure, having various components removed therefrom for clarity purposes.
Figure 3:
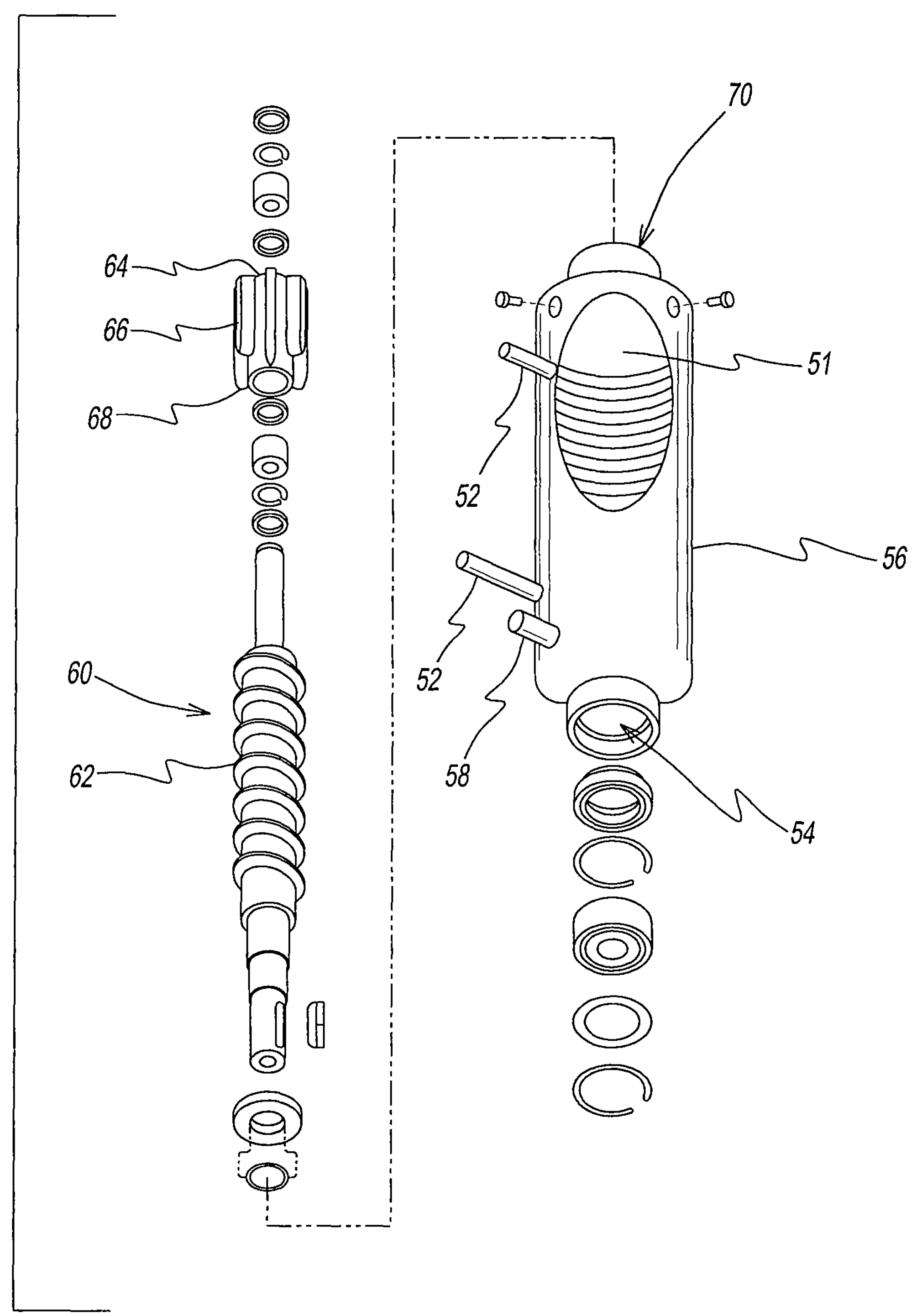
FIG. 3 is an exploded view of an augur and casing of the ice making machine of FIG. 2.
Figure 13:
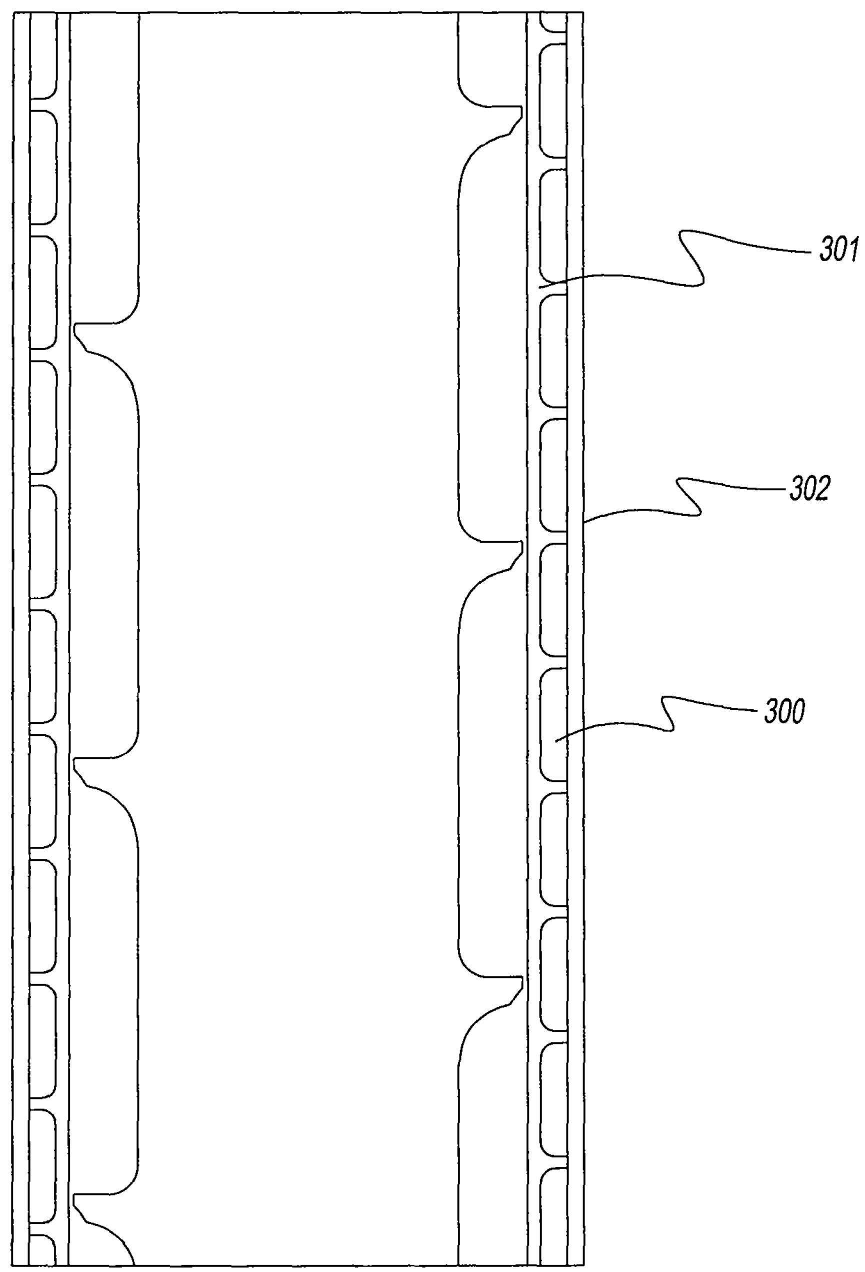
FIG. 13 is a cross sectional view of an ice machine of alternate construction according to the present disclosure wherein the casing contains an annular space for refrigerant flow.

As shown in FIGS. 2 and 3, ice maker 50 may be a conventional augur-type ice machine that can transform the flavored liquid into flavored ice pieces or flakes, and thereafter into nuggets. It is preferred that ice maker 50 is a cylindrical augur-type ice machine having an ice making evaporator 51. Evaporator 51 includes a heat exchange tube 52 carrying a refrigerant that is utilized for cooling an ice making chamber 54. More specifically, heat exchange tube 52 extends into ice maker 50 near a lower portion of ice making chamber 54, coils around a housing defining ice making chamber 54, and exits the ice maker 50 near an upper portion of the ice making chamber 54. The coiled portion of heat exchange tube 52 is surrounded by a casing 56 for insulative and protective purposes. Casing 56 is preferably made of metal, such as a tin-based solder. Alternately to this construction, see FIG. 13 wherein heat exchange may be accomplished using an annular space 300 formed by two concentric cylinders 301 and 302, sometimes refer to as shell in shell.

Flavored liquid is delivered from reservoir 28 via a conduit 13 to a lower portion of ice making chamber 54 via an inlet port or supply tube 58. Flavored liquid is preferably delivered to ice making chamber 54 via natural flow forces (for example, gravity). Flavored liquid typically fills ice making chamber 54 to the same level as reservoir 28.

An augur 60 is positioned within ice making chamber 54 and includes a generally spiral-shaped augur flight 62. Augur flight 62 has a diameter that is slightly less than the diameter of ice making chamber 54 so that augur flight 62 removes most of the ice build-up from the wall of ice making chamber 54. For example, augur flight 62 has a diameter that is preferably between 0.001 and 0.01 inches smaller than the diameter of ice making chamber 54 so that all but a thin layer of ice is removed from the wall of ice making chamber 54 when augur 60 rotates. An augur motor (not shown) rotates augur 60, in a direction so that augur flight 62 generates a lifting motion. As provided above, ice making chamber 54 is generally filled with flavored liquid along the length of augur 60 so that the flavored liquid adjacent to ice making chamber 54 wall is frozen into flavored ice crystals. Therefore, as the flavored ice crystals are being formed, the rotating augur flight 62 scrapes the layer of ice from the inner surface and transports the newly-formed flavored ice in an upward direction.

As shown in FIG. 3, the flavored ice is separated into pieces by an ice cutting head 64 having a plurality of generally vertical blades 66. The leading edge of each of the blades 66 preferably has a tapered portion 68 to act as a wedge and split the ice into flavored ice pieces. Ice cutting head 64 is coupled to augur 60 so that ice cutting head 64 does not rotate along with augur flight 62. Based on the size and shape of cutting head 64, ice maker 50 can be used to form flavored ice pieces into a desired shape and size.

To form flavored ice nuggets, flavored ice pieces are then forced upwards past ice cutting head 64 and through an output end or opening 70 defined by ice making chamber 54 and ice cutting head 64, where a rotating ice wiper 72 sweeps the flavored ice pieces away from opening 70, as shown in FIG. 2.

Ice wiper 72, which includes a pair of projections 74 coupled to a body portion 76, is connected to augur 60 such that the respective components 60 and 72 rotate in unison with each other. Body portion 76 has an arcuate, tapered underside surface that gradually urges the flavored ice pieces in a radial direction out of opening 70. The ice that is extruded through the cutting head 64 breaks into one of the flavored ice nuggets upon contact with the underside of body portion 76. Therefore, the distance between the tapered underside of body portion 76 and opening 70 controls the length of the flavored ice nuggets. Furthermore, as augur 60 and ice wiper 72 rotate, projections 74 sweep the flavored ice nuggets further away from opening 70.

In addition, to alter the shape and the size of the flavored ice nuggets described, post-formation treatments squeeze out water clinging to the ice, thereby causing the flavored ice nuggets to have a higher cooling capacity per pound of ice and increasing the cooling potential of the flavored ice nuggets.

After being expelled from the ice making chamber 54, the flavored ice nuggets move through a transfer zone and into storage bin 16. The transfer zone is defined by a path between the ice making chamber 54 and storage bin 16. For example, the transfer zone in FIG. 2 includes, but is not limited to, the area adjacent to the ice making chamber opening 70, a strainer 78 and an ice chute 80. See US Patent Publication No. 2006/0277937 for an ice maker, which is incorporated herein in its entirety by reference thereto.

Figure 4:
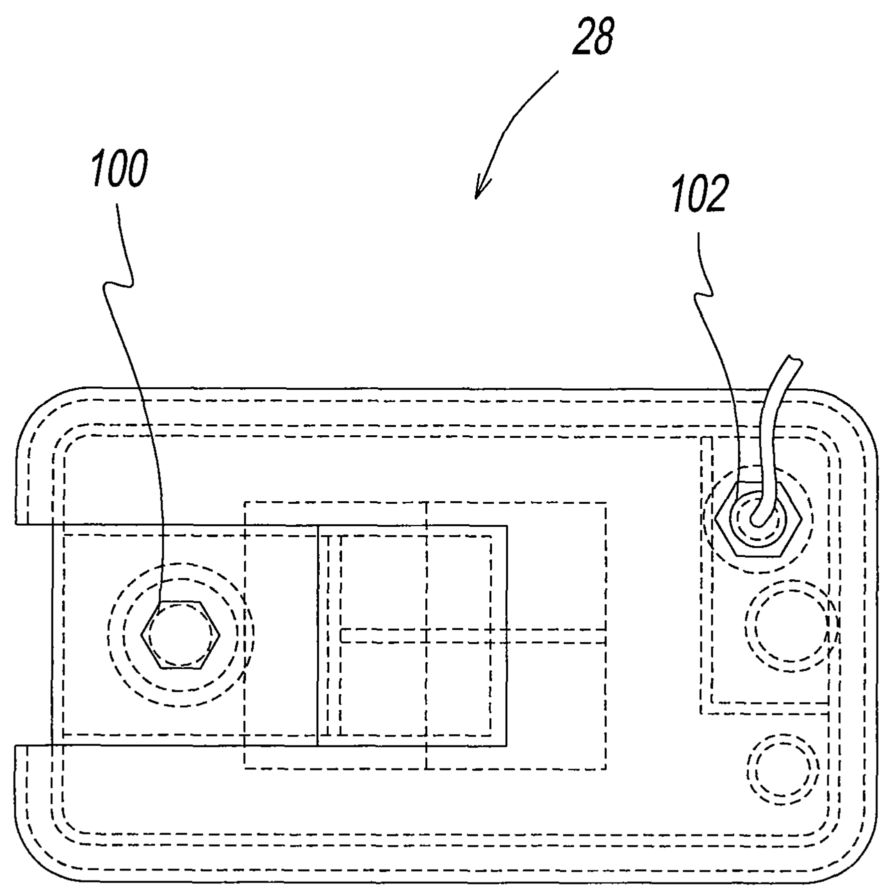
FIG. 4 is a top view of a reservoir shown in FIG. 1.
Figure 5:
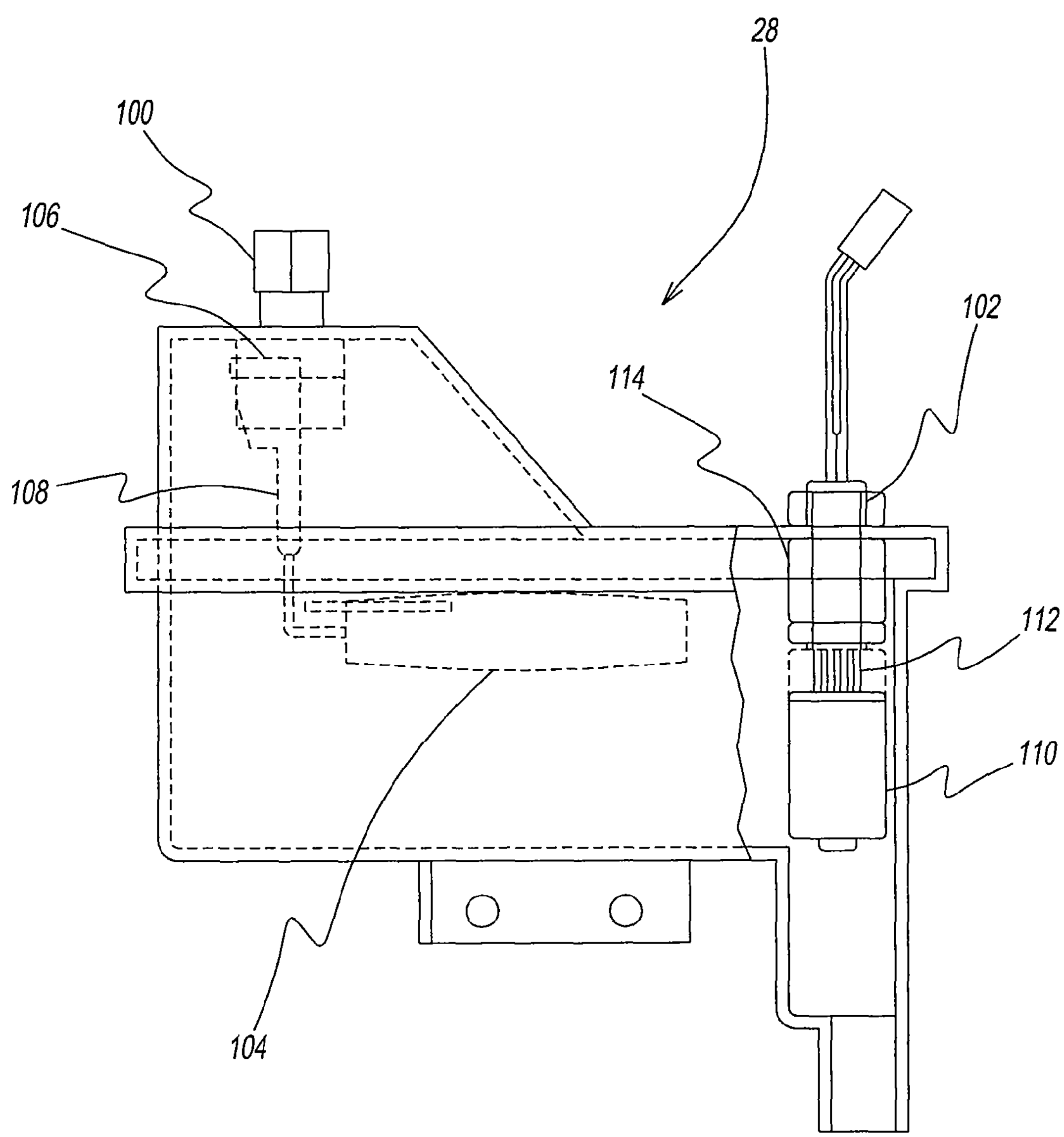
FIG. 5 is a side view of the reservoir shown in FIG. 4.
Figure 6:
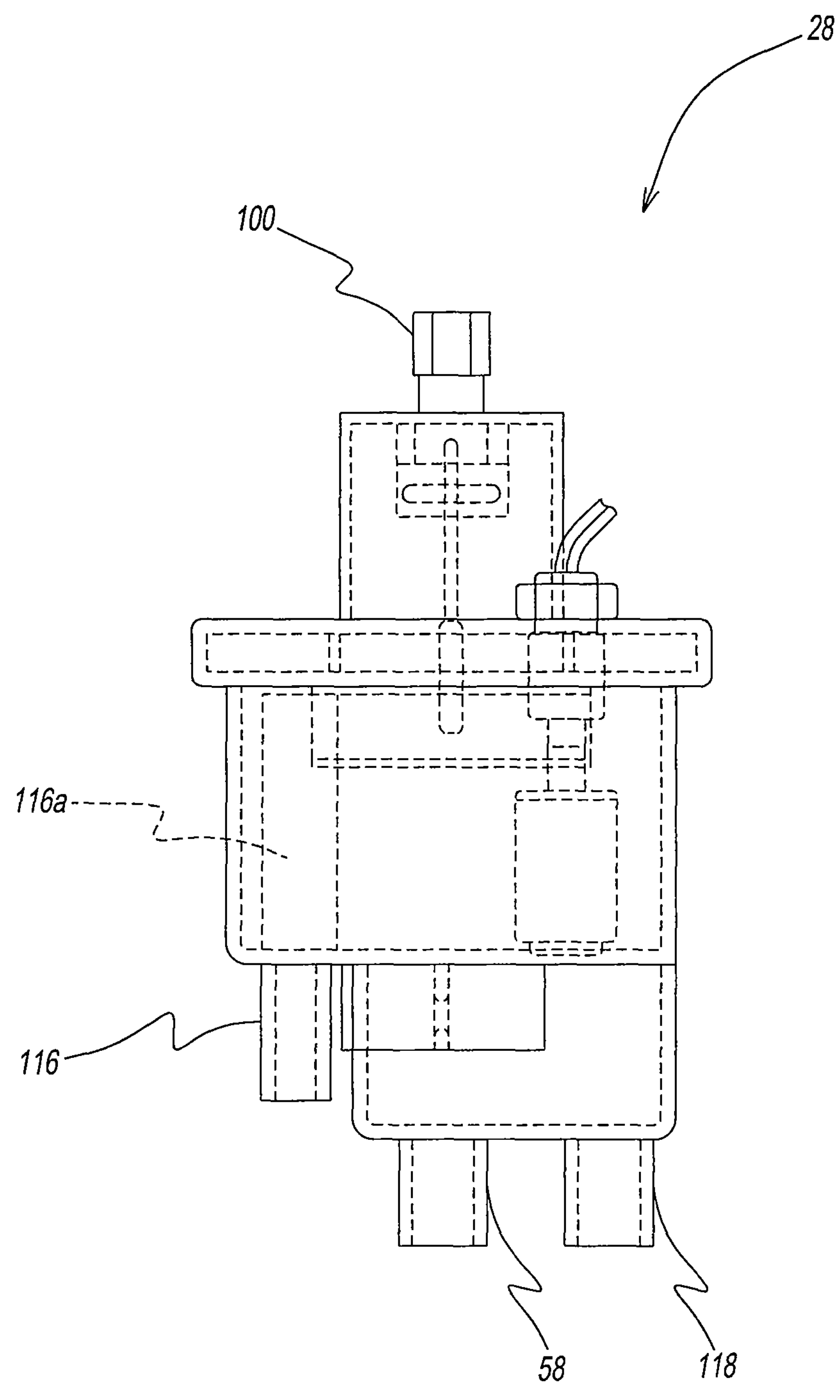
FIG. 6 is a front view of the reservoir shown in FIG. 4.

Reservoir 28 maintains the level of the flavored liquid being supplied to ice machine 14 via a mechanism 30. Reservoir 28 may include a first mechanism for controlling the flavored liquid level in reservoir 28, and a second mechanism for deactivating the ice machine 14 if the flavored liquid level is below a predetermined threshold. For example, as shown in FIGS. 4-6, reservoir 28 includes a float valve 100 configured to control a volume flow of flavored liquid into reservoir 28 and a level sensor 102 configured to detect a flavored liquid level within reservoir 28.

Float valve 100 is a mechanically-actuated having a floating element 104, a valve 106, and an attachment arm 108 extending therebetween. When floating element 104 is positioned at or above a predetermined height within reservoir 28, arm 108 causes valve 106 to be in a closed position (as shown by the floating element 104 drawn in the phantom line in FIG. 5). If floating element 104 moves below the predetermined height, arm 108 causes valve 106 to move into an open position, thereby permitting flavored liquid to flow into reservoir 28.

Level sensor 102 is electrically connected to control system 250 to deactivate ice machine 14 if the flavored liquid in reservoir 28 drops below a predetermined level. Level sensor 102 includes a floating element 110 having a magnet coupled thereto and a guide arm 112 connecting floating element 110 to a reed switch 114. Reed switch 114 detects the position of the magnet on floating element 110 to determine a threshold water level within reservoir 28. Level sensor 102 is configured to activate an electrical circuit indicating to the control system that the flavored liquid level has dropped below a predetermined level (as shown by the floating element 110 drawn in the solid line in FIG. 5). However, if the flavored liquid is above the predetermined level (as shown by the floating element 110 drawn in the phantom line in FIG. 5), then level sensor 102 will deactivate the electrical circuit.

If the flavored liquid level in reservoir 28 is undesirably low, or if reservoir 28 is empty, ice making chamber 54 may not receive a sufficient amount of flavored liquid to make flavored ice. Additionally, the lack of flavored water in ice making chamber 54 may cause the chamber temperature to drop to an undesirable level; thereby causing damage to ice machine 14. For example, if no flavored liquid is present in the ice making chamber 54, the temperature therein will become too cold and the walls of ice making chamber 54 may be permanently deformed; thereby preventing an effective scraping contact between augur 60 and the walls of ice making chamber 54 and potentially damaging augur 60.

As shown in FIG. 6, reservoir 28 also includes an overflow tube 116 that diverts flavored liquid if reservoir 28 is overflowing. More particularly, overflow tube 116 includes a stand-up portion 116*a* that extends into the reservoir 28 by a predetermined distance. The predetermined distance is preferably greater than the normal operational flavored liquid level in reservoir 28, such that when float valve 100 is functioning properly the flavored liquid level is below the top of stand-up portion 116*a* of overflow tube 116.

Furthermore, reservoir 28 includes a drainage tube 118 for draining flavored liquid from water reservoir 28 when desired. For example, when performing maintenance on and cleaning of ice making system 10, it may be desirable to drain the flavored liquid from the system. During normal operation of ice making system 10, a solenoid valve 119 closes drainage tube 118 to maintain the desired flavored liquid level within reservoir 28, as shown in FIGS. 1 and 7-9.

As shown in FIG. 1, flavored ice is then transported via a conduit 15 to storage bin 16, where flavored ice nuggets 32 are stored until needed for consumption. Preferably, storage bin 16 is located below the top of ice machine 40 so flavored ice nugget 32 can naturally fall through or slide along the transfer zone into storage bin 16 via gravity. For this embodiment, conduit 15 may be an ice chute. However, it is also contemplated that flavored ice nuggets 32 can be transported in any direction via conduit 15 by pressure or pumps or other mechanisms.

Storage bin 16 has a storage area for holding flavored ice nugget 32. Preferably, storage bin 16 comprises insulated exterior walls and a closable opening that provides a user with access to flavored ice nugget 32. Furthermore, it is preferred that storage bin 16 is refrigerated by a mechanical refrigeration system 262. Refrigeration system 262 may include a temperature measuring device and a control system to regulate the temperature. For example, the temperature measuring device includes a sensor that outputs a signal indicative of a current temperature in storage bin 16. Control system 250 operates refrigeration system 262 to increase or decrease the current temperature to a desired or predetermined temperature.

Storage bin 16 maintains a temperature to stabilize flavored ice nugget 32 and prevent melting. In addition, stabilizing the temperature of storage bin 16 reduces leaching of flavoring 22 from flavored ice nugget 32. Preferably the temperature in storage bin 16 is up to 32° F. More preferably, the temperature is between the range of about 20° F. and about 32° F.

In addition, storage bin 16 may include an electrical or mechanical device for determining the level of flavored ice nugget 32 within the storage area, such as a level sensor, an optical sensor, a reed switch or other similar electrical or mechanical device. This device may be in communication with ice machine 14, pump 26 and/or mechanism 30 of reservoir 28 so as to regulate the flow of flavored liquid into ice machine 14. Thus, the level of flavored ice nuggets 32 within storage bin 16 controls the operation of ice making system 10. For example, as the level of flavored ice nugget 32 in storage bin 16 decreases to a set minimum level, ice machine system 10 begins production of flavored ice nugget 32. Also, should the level of flavored ice nugget 32 reach a set maximum level, ice making system 10 will stop the production of flavored ice.

Figure 7:
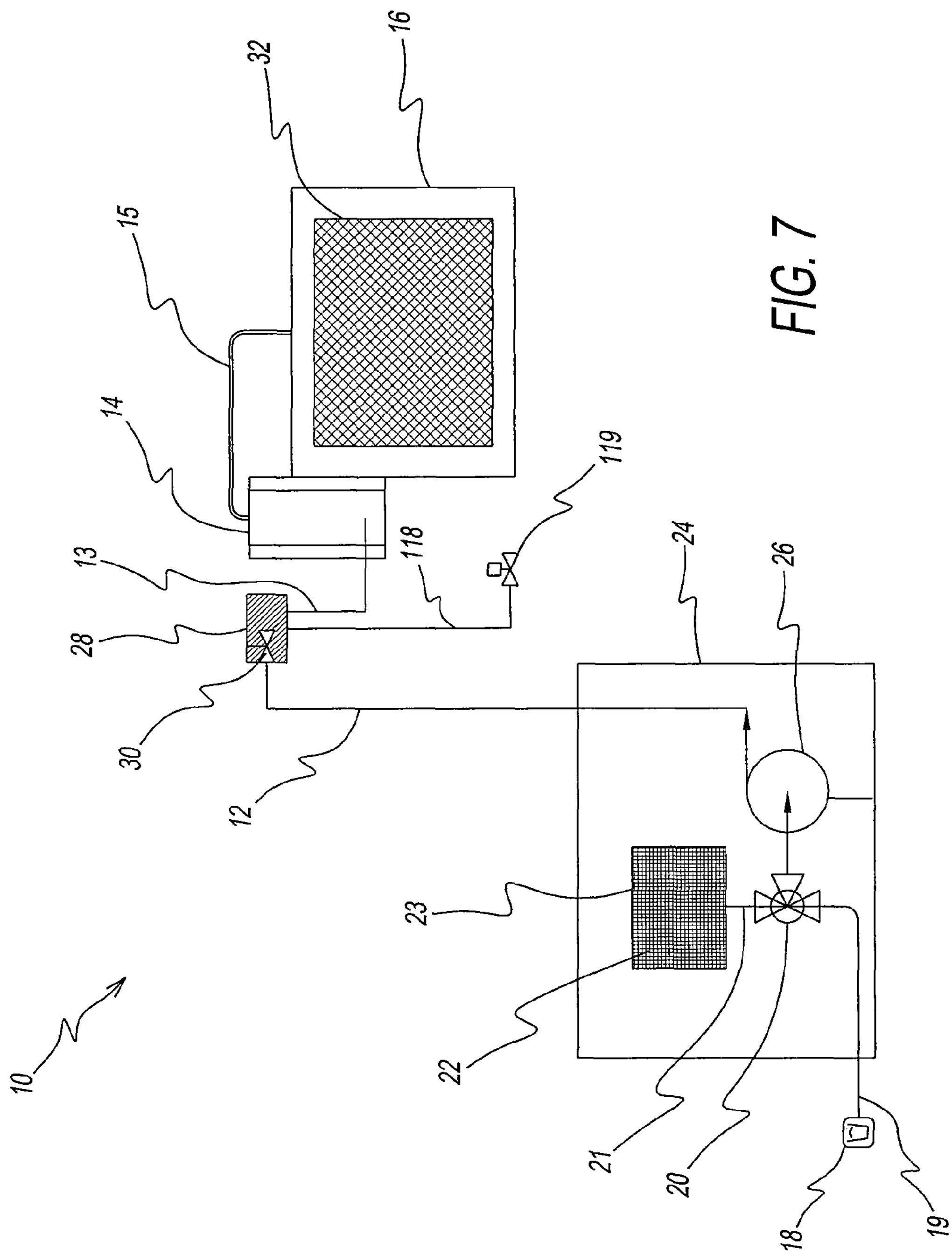
FIG. 7 is a schematic illustration of another embodiment of the ice making system of FIG. 1 for making flavored ice nuggets.

FIG. 7 shows another embodiment of ice making system 10 of the present disclosure. In this embodiment, valve 20 and pump 26 are housed within refrigerated compartment 24 and thus stored in a refrigerated environment. This provides a more compact design and maintains the shelf life of flavoring 22.

Figure 8:
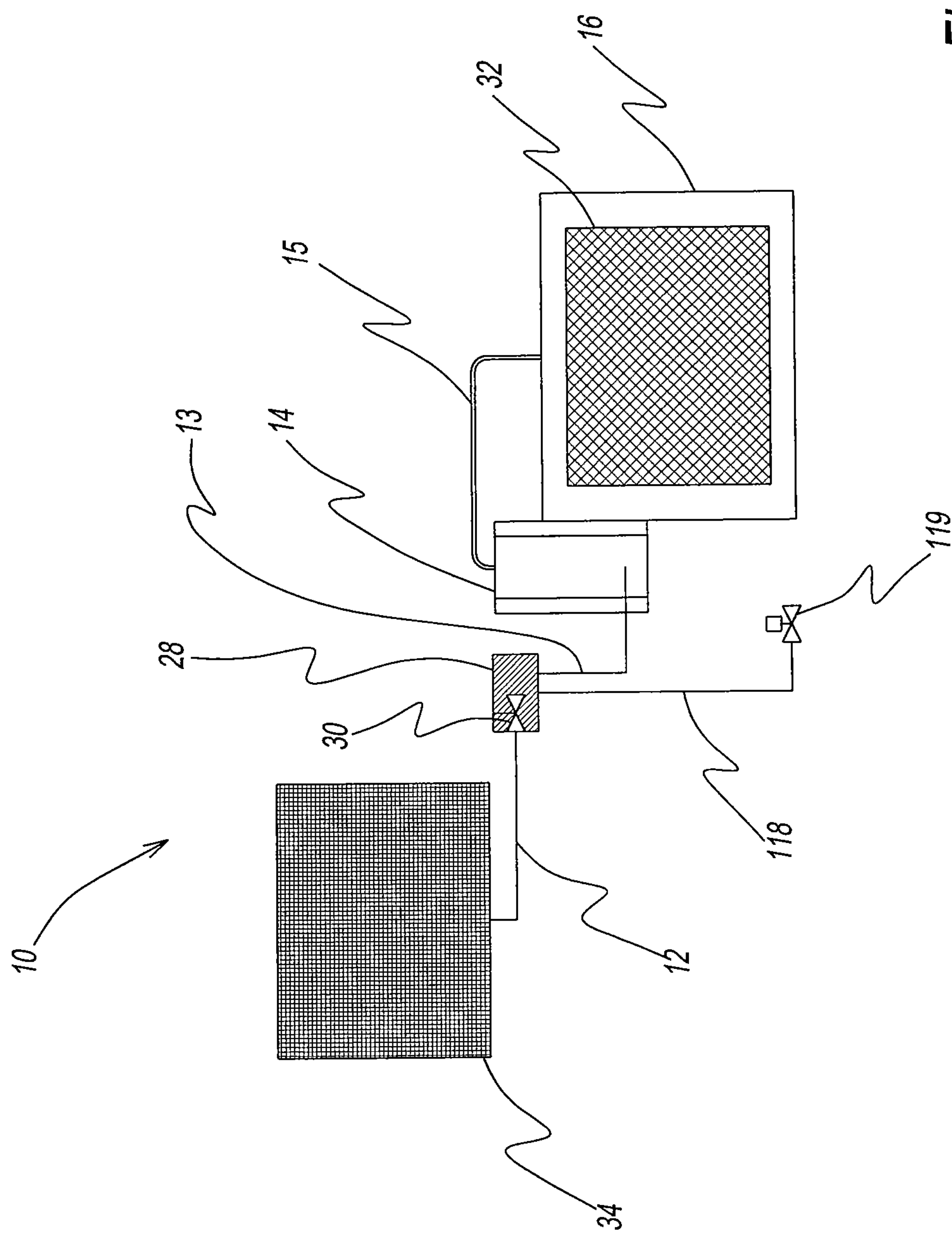
FIG. 8 is a schematic illustration of another embodiment of the ice making system of FIG. 1 for making flavored ice pieces.

In yet another embodiment, as shown in FIG. 8, water 18 and flavoring 22 are not mixed within ice making system 10 to make flavored liquid. Instead, ice making system 10 has a pre-made flavored liquid disposed in container 34 provided by the user. Thus, flavored liquid within container 34 is supplied to ice machine 14, preferably via reservoir 28. For example, container 34 holds pre-made flavored liquid, such as brewed coffee, tea, juice etc. Preferably, container 34 holds brewed coffee.

Figure 9:
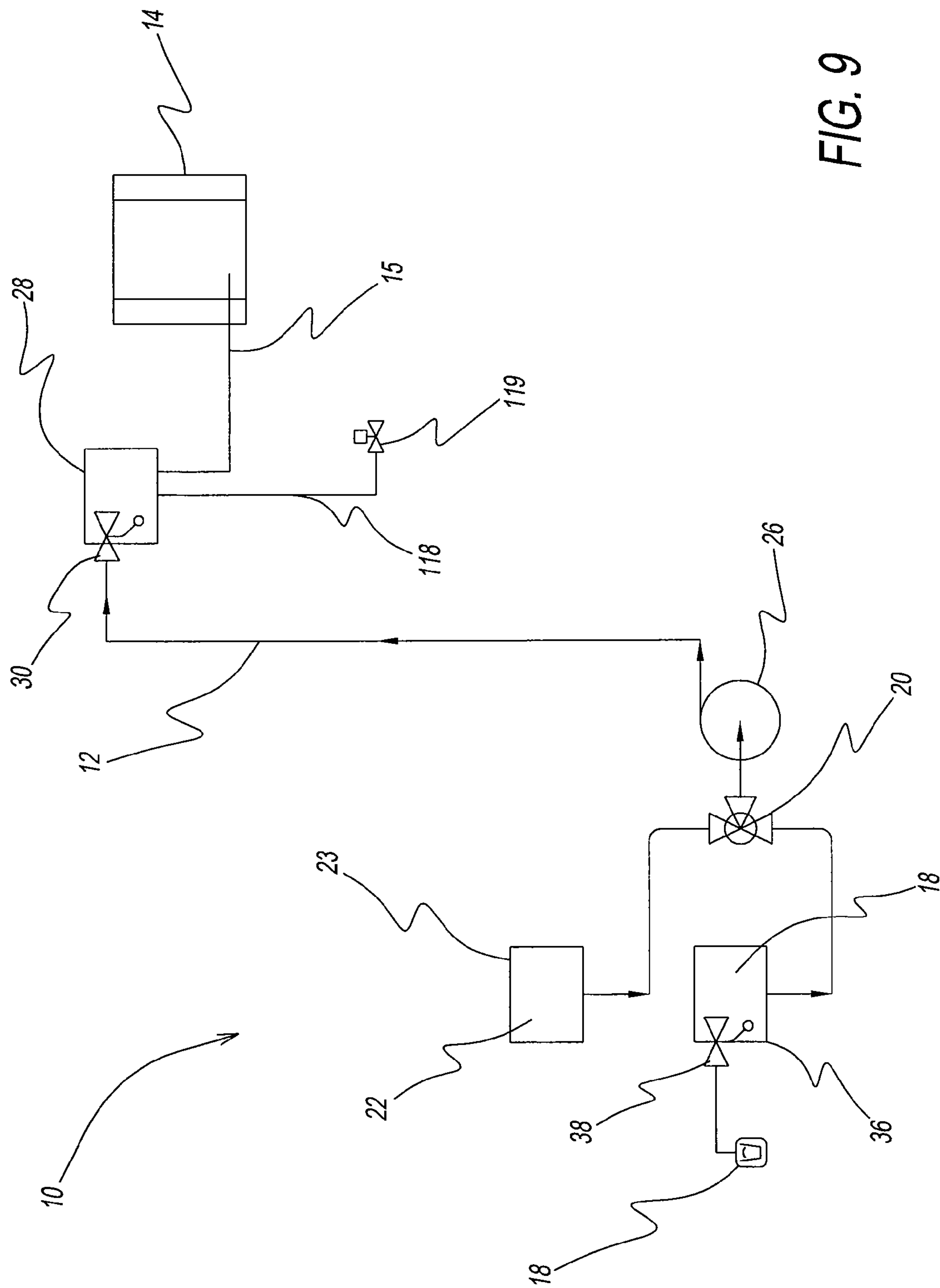
FIG. 9 is a schematic illustration of another embodiment of the ice making system of FIG. 1 for making flavored ice pieces.

FIG. 9 shows another embodiment of ice making system 10, having a receptacle 36 for holding water received from water supply 18. Receptacle 36 may have a control 38, such as a float valve, a dual level switch, etc., to detect the level of water within. Having receptacle 36 allows ice making system 10 to be portable since not restricted to being connected to a continuous water supply.

Furthermore, ice making system 10 may also have an automated maintenance feature for cleaning, sanitizing and flushing all residue and other elements from ice making system 10. The maintenance system cleans valves, tubes, pumps, mixing chambers and reservoirs present in ice making system 10. This may include an auxiliary fluid delivery system that distributes a liquid comprising a controlled ratio of cleaning solution and water or water itself.

Figure 10:
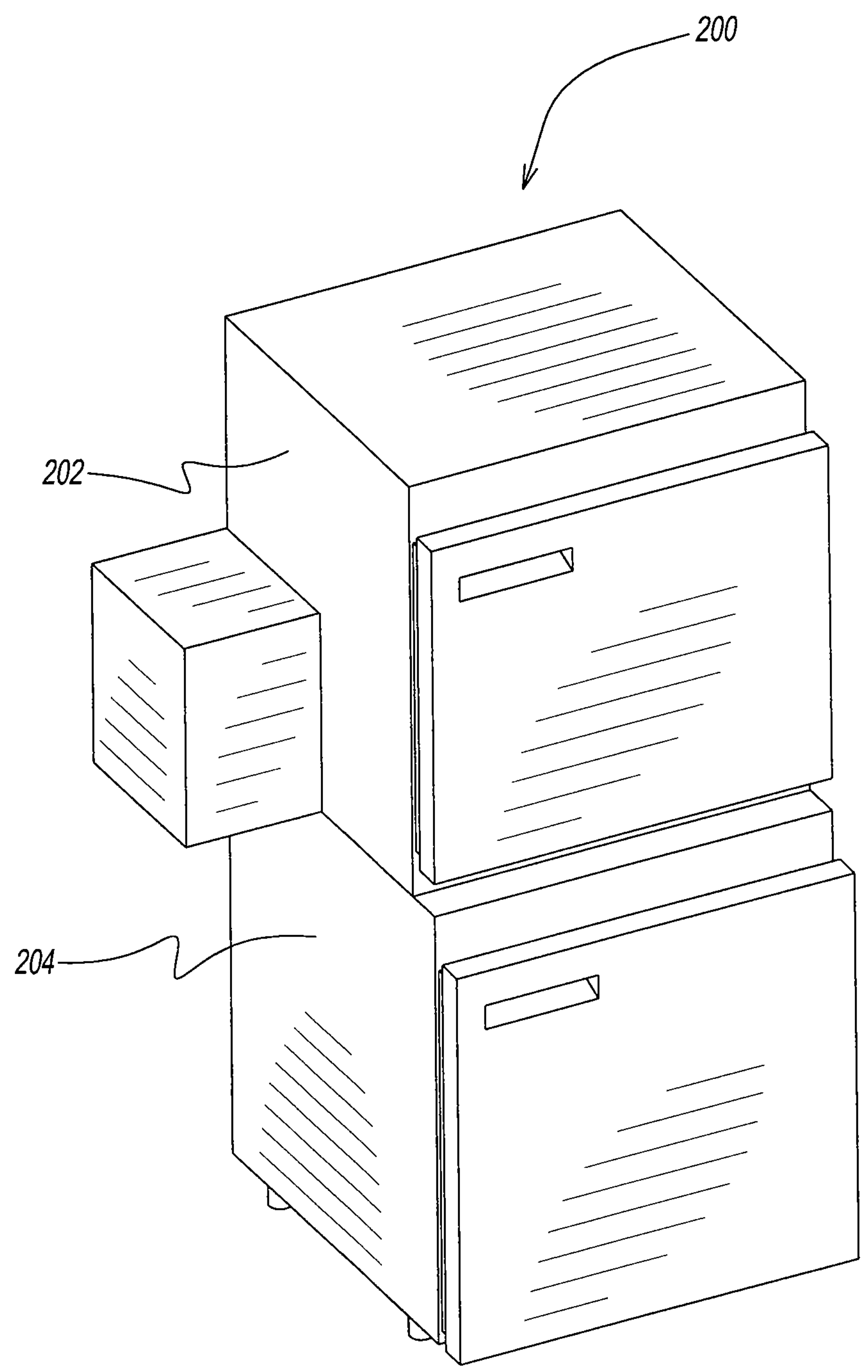
FIG. 10 is a front left-side perspective view of the first and second compartments of the ice making system according to FIG. 1.

As shown in FIG. 10, ice making system 10 is preferably housed within a housing 200. Housing 200 has an upper or first compartment 202 and a lower or second compartment 204, each having an insulated door 206 for opening and closing their respective compartments. It is preferred that upper compartment 202 and lower compartment 204 are refrigerated, thus each having an evaporator, compressor and condenser system as shown by refrigeration systems 260 and 262 in FIG. 1. However, it is also contemplated that housing 200 has a single evaporator, compressor and condenser system which provides refrigeration to each compartment. In addition the compressor(s) and/or condenser(s) may be remote from housing 200 to avoid noise and heat around the vicinity of housing 200. Housing 200 can be made out of any durable material, such as, stainless steel, aluminum, plastic, etc.

Figure 11:
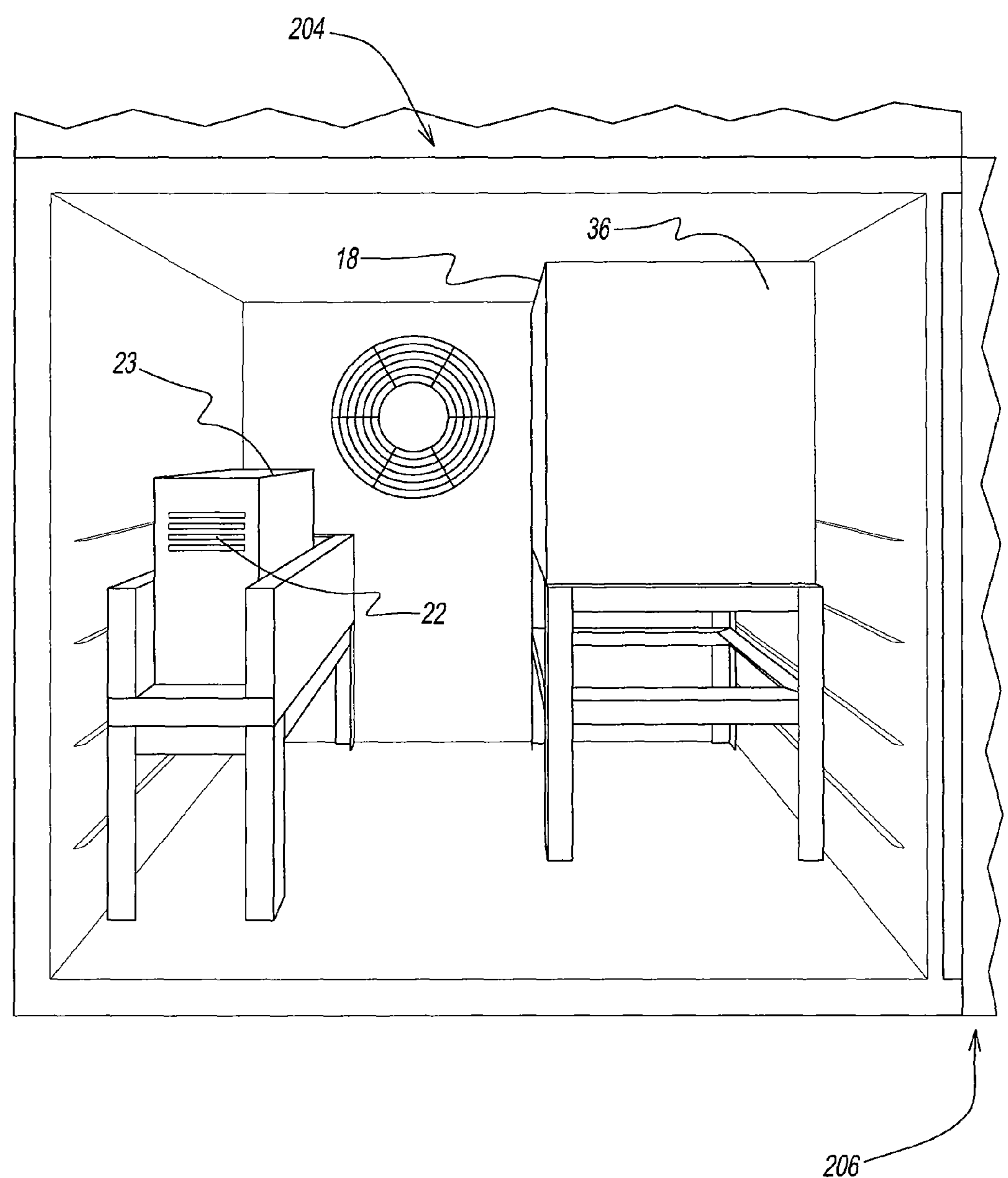
FIG. 11 is a front view of the interior of the second or lower compartment for the ice making system of the present disclosure.

As shown in FIG. 11, lower compartment 204 may include a number of components of ice making system 10, including, but not limited to, receptacle 36 containing water, vessel 23 containing flavoring 22, mixing valve 20 and pump 26. Lower compartment 204 also provides the user with additional refrigerated storage space.

Figure 12:
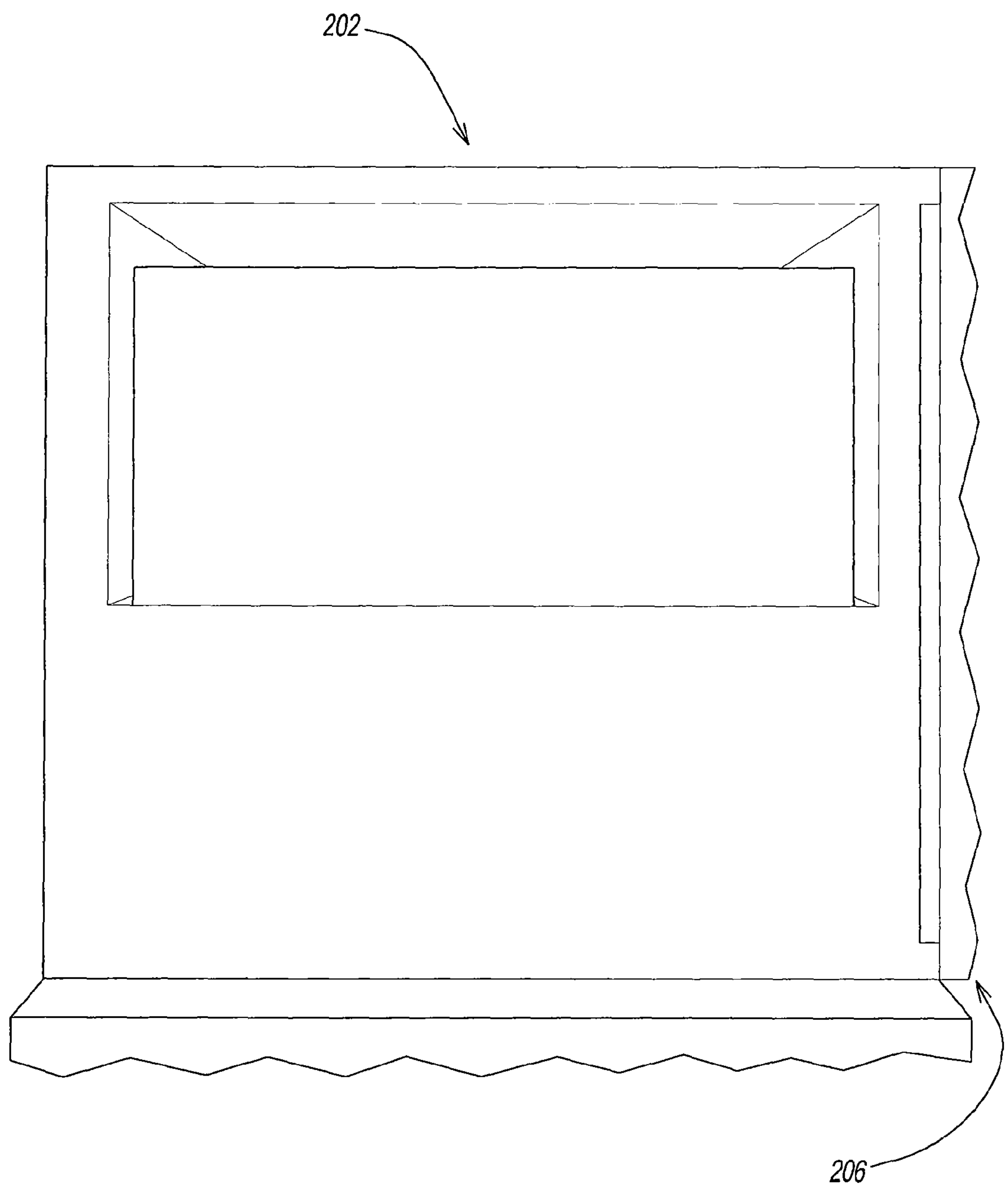
FIG. 12 is a front view of the interior of a first or upper compartment for the ice making system of the present disclosure.

FIG. 12 shows upper compartment 202 which may include reservoir 28, ice machine 14 and storage bin 16 containing the continuously produced flavored ice nugget 32. In some embodiments, reservoir 28 and ice machine 14 are not refrigerated, however, they are still within upper compartment 202. Flavored ice nuggets 32 are accessible by a user in a variety of ways, including, but not limited to, being removed manually by a scoop or automatically using a dispenser. Upper compartment 202 further has delivery tubing that is in fluid communication with the components of lower compartment 204. Upper compartment 202 may provide the user with additional refrigerated storage space.

The present disclosure having been thus described with particular reference to the preferred forms thereof, it will be obvious that various changes and modifications may be made therein without departing from the spirit and scope of the present disclosure as defined in the appended claims.

What is claimed is:

1. An ice making system for making flavored ice pieces comprising:

a vessel that stores a flavoring;

a source of water;

a mixing device that mixes said flavoring with the water to produce a flavored liquid;

a pump that controls a flow of said flavored liquid to a reservoir;

an ice machine comprising an ice making evaporator and an augur centrally disposed within said evaporator, wherein said ice machine receives said flavored liquid from said reservoir and produces said flavored ice pieces;

a storage bin for storing said flavored ice pieces; and a refrigeration system that refrigerates said vessel and said flavoring and that regulates a temperature in said storage bin to reduce leaching of said flavored liquid from said flavored ice pieces.

2. The ice making system of claim 1, wherein said mixing device comprises a mixing valve.

3. The ice making system of claim 1, further comprising at least one other refrigeration system that refrigerates one or more selected from the group consisting of: said reservoir and said ice machine.

4. The ice making system of claim 1, wherein said flavored ice pieces are removed from said storage bin either manually or automatically via a dispenser.

5. The ice making system of claim 1, wherein said refrigeration system further refrigerates one or more of said pump, said reservoir, said ice making machine and said storage bin.

6. The ice making system of claim 1, further comprising a control system that controls said ice making machine to produce said flavored ice pieces.

7. The ice making system of claim 6, further comprising a float mechanism disposed to maintain a predetermined level of said flavored liquid in said reservoir; and wherein said control system also deactivates said ice making machine if said flavored liquid drops below said predetermined level.

8. The ice making system of claim 6, further comprising a temperature device disposed in said storage bin; and wherein said control system regulates said temperature in said storage bin based on an output of said temperature measuring device in a range between about 20° F. and about 32° F.

9. The ice making system of claim 1, wherein said ice pieces are selected from the group consisting of: flakes and nuggets.

10. The ice making system of claim 1, wherein said flavoring is selected from the group consisting of: a concentrate, extract, syrup, juice and other flavored product.

11. The ice making system of claim 10, wherein said flavoring is coffee, a coffee concentrate or a coffee extract.

12. A method for making flavored ice pieces comprising:

holding a flavoring in a vessel;

controlling a mixing device to mix a flavoring with water to produce a flavored liquid;

controlling with a pump a flow of said flavored liquid to a reservoir;

delivering said flavored liquid from said reservoir to an ice making machine;

producing said flavored ice pieces with said ice making machine;

storing said flavored ice pieces in a storage bin;

refrigerating said vessel, said flavoring and one or more of said pump, said reservoir, said ice making machine and said storage bin; and regulating a temperature in said storage bin to reduce leaching of said flavored liquid from said flavored ice pieces.

13. The method of claim 12, wherein said ice pieces are selected from the group consisting of: flakes and nuggets.

14. The method of claim 12, further comprising maintaining a predetermined level of said flavored liquid in said reservoir; and deactivating said ice making machine if said flavored liquid drops below said predetermined level.

15. The method of claim 12, wherein said regulating step maintains said temperature in said storage bin in a range between about 20° F. and about 32° F.

16. The method of claim 12, further comprising removing said flavored ice pieces from said storage bin either manually or automatically.

17. The method of claim 12, wherein a flavoring for said flavored ice pieces is selected from the group consisting of: a concentrate, extract, syrup, juice and other flavored product.

18. The method of claim 17, wherein said flavoring is coffee, a coffee concentrate or a coffee extract.

* * * * *